United States Patent
Chen et al.

(10) Patent No.: US 7,643,962 B2
(45) Date of Patent: Jan. 5, 2010

(54) METHOD FOR JUDGING DIRECTIONALITY BY UTILIZING A GRAVITY SENSOR

(75) Inventors: Shoel-Lai Chen, Chung Ho (TW); Che-Hao Hsu, Chung Ho (TW)

(73) Assignee: Topseed Technology Corp., Taipei Hsien (TW)

( * ) Notice: Subject to any disclaimer, the term of this patent is extended or adjusted under 35 U.S.C. 154(b) by 0 days.

(21) Appl. No.: 12/046,644

(22) Filed: Mar. 12, 2008

(65) Prior Publication Data

US 2009/0234615 A1 Sep. 17, 2009

(51) Int. Cl.
*G06F 19/00* (2006.01)

(52) U.S. Cl. .......................... 702/150; 702/93; 702/94; 702/95; 702/169

(58) Field of Classification Search .............. 702/92–95, 702/150, 169
See application file for complete search history.

(56) References Cited

U.S. PATENT DOCUMENTS

| | | | |
|---|---|---|---|
| 6,766,270 B2 * | 7/2004 | Udomkesmalee | 702/150 |
| 7,275,008 B2 * | 9/2007 | Plyvanainen | 702/92 |
| 7,305,315 B2 * | 12/2007 | Kwon et al. | 702/92 |

* cited by examiner

*Primary Examiner*—Drew A Dunn
*Assistant Examiner*—Hien X Vo
(74) *Attorney, Agent, or Firm*—Chun-Ming Shih

(57) ABSTRACT

A method for judging directionality of a housing having two parallel panels by a gravity sensor is disclosed. The method is used for a handheld apparatus to judge which of the panels is upward. The method first obtains a set of component quantity of gravity on three coordinate axes from a three dimensional gravity sensor. When $-0.5\ g > g_z \geq -1\ g$ and $1\ g \geq g_z > 0.5\ g$, a first direction status and a second direction status is acquired, respectively. When $0.5\ g \geq g_z \geq -0.5\ g$, the method further reposes on two parameters, polarity of $g_z$ and magnitude of the component quantity on y-axis ($g_y$), to judge. When $g_z > 0$ and $-0.5\ g > g_y \geq -1\ g$ or when $g_z < 0$ and $1\ g \geq g_y > 0.5\ g$, the judging result is the first direction status. When $g_z < 0$ and $-0.5\ g > g_y \geq 1\ g$ or when $g_z > 0$ and $1\ g \geq g_y > 0.5\ g$, it is the second one. The rest will be judged to be "don't care".

5 Claims, 5 Drawing Sheets

(A)

(B)

METHOD FOR JUDGING DIRECTIONALITY BY UTILIZING A GRAVITY SENSOR

TECHNICAL FIELD

This invention relates to gravity sensing, and more particularly to technique of judging directionality of an apparatus by gravity sensing.

BACKGROUND OF THE INVENTION

With great advance of battery and semiconductor technologies, so many kinds of handheld apparatuses, such as mobile phones, portable multimedia players (PMPs), remote controls, MPS players, personal digital assistants, digital cameras, portable global positioning systems, electronic dictionaries, the SideShow devices used for the VISTA operating system of Microsoft etc., become popular. It is very confused and inconvenient that a user carries or uses various individual handheld apparatuses. Thus, a 2-in-1 integrating approach is adopted by many conventional handheld apparatuses, such as a combination of a SideShow device and a remote control, or a combination of a mobile phone and a PMP. Usually, those 2-in-1 apparatuses arrange keypads of the two combined systems on two opposite side of a cuboidal housing, respectively. When a user holds the 2-in-1 apparatus with his/her palm to operate either of the two systems facing him/her, it will be very possible that the keypad on backward side of another system not being operated is unintentionally pressed. Therefore, undesired operations and unnecessary power consuming of battery will occur.

It is necessary for those handheld apparatuses with double-sided keypad arrangement that they equip a switch for switching a keypad on either side to be enabled and the other one to be disabled because the switch can prevent users from intentional operations to the disabled keypad. The abovementioned switches may adopt either manual or automatic manner. The manual manner is to be executed by a manual operation applying on a mechanical switch. It is inconvenient. The automatic manner uses a gravity sensor to detect the directionality of the handheld apparatus for judging one-sided keypad is in an upward direction. The judged upward keypad belongs to the system the user is using. Therefore, that keypad is automatically enabled, and the other one is disabled simultaneously. However, all the conventional methods for judging directionality by utilizing a gravity sensor have to make an accurate and complicated calculation for component quantities on three dimensional rectangular coordinate axes to obtain a judging result. Such calculations require microprocessors with high performance to execute. Those microprocessors are not only larger in size also expensive in cost, so that they are not suitable for small-scale apparatuses or low-price products.

SUMMARY OF THE INVENTION

A primary object of the invention is to provide a method for judging directionality by utilizing a gravity sensor, which directly use the component quantities on three axes to judge directionality without any processes of calculation. Therefore, the invention can simplify a judging process and does not require high-performance microprocessors to execute. Further, the invention can be more widely applicable.

To accomplish the abovementioned object, the method first receives a set of component quantity of gravity on three coordinate axes from a three dimensional gravity sensor. A first-staged judging result can be acquired by the component quantity of gravity on z-axis ($g_z$). When $-0.5\,g > g_z \geq -1\,g$ and $1\,g \geq g_z > 0.5\,g$, a first direction status and a second direction status is acquired, respectively. When $0.5\,g \geq g_z \geq -0.5\,g$, the method further reposes on two parameters, the polarity of $g_z$ and the component quantity on y-axis ($g_y$), to judge. When $g_z > 0$ and $-0.5\,g > g_y \geq -1\,g$ or when $g_z < 0$ and $1\,g \geq g_y > 0.5\,g$, the judging result is the first direction status. When $g_z < 0$ and $-0.5\,g > g_y \geq -1\,g$ or when $g_z > 0$ and $1\,g \cong g_y \geq 0.5\,g$, it is the second one. The rest will be judged "don't care", which means holding the original status without switching.

DETAILED DESCRIPTION OF THE INVENTION

Figure 1:
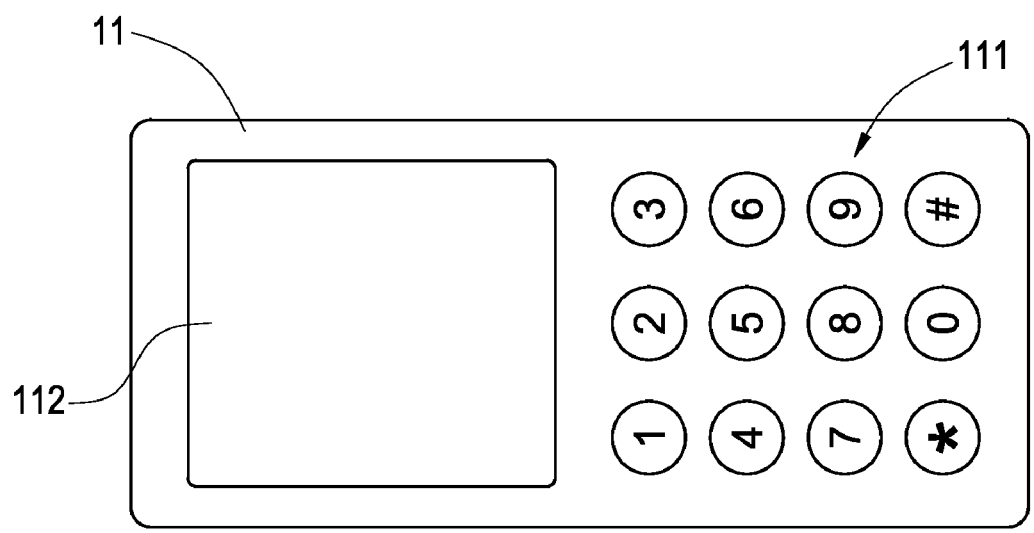
FIG. 1 illustrates a handheld apparatus having double-sided keypad arrangement for which the method of the invention is used.
Figure 1:
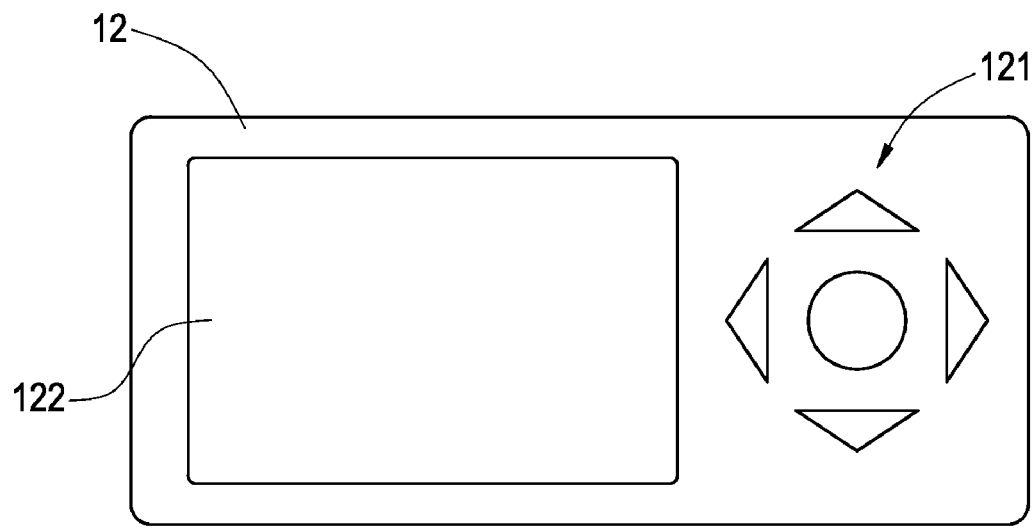

First referring to FIG. 1, a handheld apparatus having double-sided keypad arrangement in accordance with the principles of the invention is shown. The apparatus has a cuboidal housing 1 including a first panel 11 and a second panel 12 which are parallel. Two keypads 111, 121 are equipped on the two panels 11, 12, respectively. Of course, other elements, such as a display 112, 122, also can be additionally equipped on the panels 11, 12.

Figure 2:
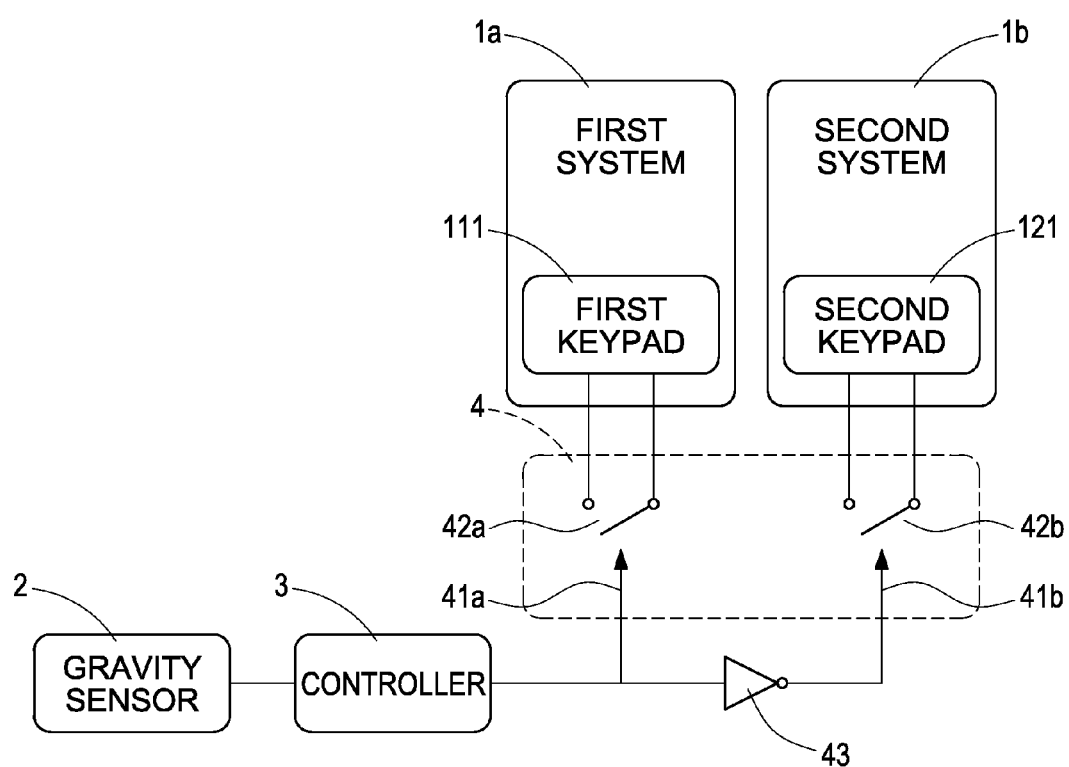
FIG. 2 illustrates a block diagram of an embodiment shown in FIG. 1.

Referring to FIG. 2, it shows a preferred embodiment according to the invention. There are two independent systems, a first system 1a and a second system 1b, in the housing 1. The two keypads 111, 121 belong to the two systems 1a, 1b, respectively. As mentioned above, the two keypads 111, 121 are located on two parallel sides of the housing, respectively. A gravity sensor 2, which can detect a distribution of gravity along three rectangular coordinate axes, is arranged in the housing 1. The gravity sensor 2 electrically connects to a controller 3. The gravity sensor 2 sends a gravity signal reflecting the distribution of gravity along three rectangular coordinate axes to the controller 3. In the embodiment as shown in FIG. 2, an output end of the controller 3 electrically connects to control ends 41a, 41b of a relay 4. An inverter (NOT gate) 43 is arranged between the two control ends 41a, 41b to make them be constantly opposite. The two control ends 41a, 41b control switches 42a, 42b to open or close, respectively. The two switches 42a, 42b electrically connect to the first keypad 111 and the second keypad 121, respectively. The controller 3 judges directionality of the housing 1 according to the gravity signal from the gravity sensor 2, and then output a switching signal to the control ends 41a, 41b of the relay 4 to have the two keypads 111, 121 enable and disable, respectively. Those skilled in the art will recognize that the term "enable" means the keypads 111, 121 are available and "disable" means they are unavailable. The two keypads 111, 121 are always under an opposite state.

Figure 3:
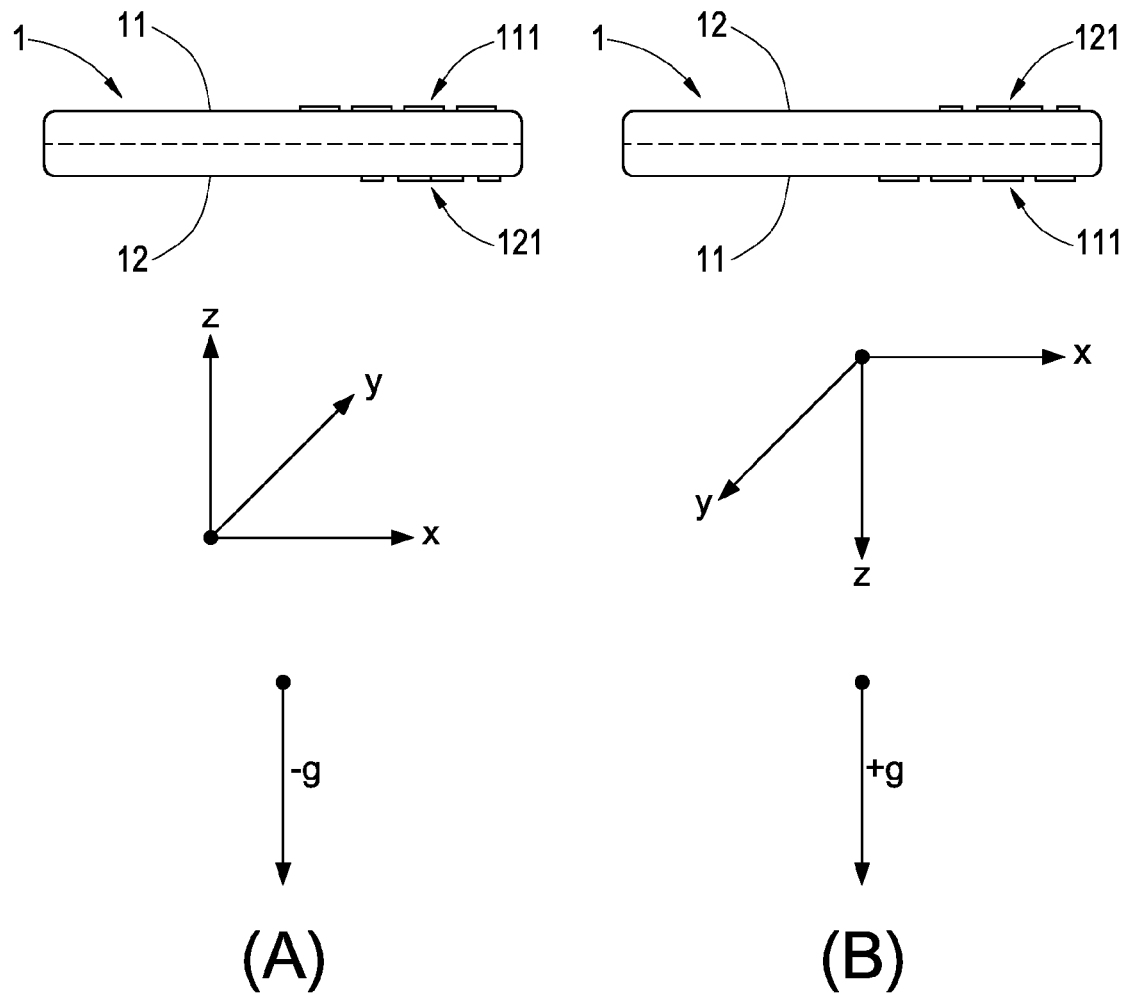
FIG. 3 is a graph indicating a principle of direction judgment according to the invention.

Referring to FIG. 3, let's suppose the housing 1 of the handheld apparatus is in a horizontal position, i.e. its both first panel 11 and second panel 12 are parallel to an x-y plane of a 3 dimensional rectangular coordinate system. Let's further suppose the first panel 11 is a front and the second panel 12 is a back, i.e. z-axis is in a direction toward the first panel 11. When the first panel 11 is upward to face a user (not shown) and the second panel 12 is downward to face the ground (not shown), a gravity of −g on z-axis will be detected as shown in FIG. 3A. (because the gravity is in an opposite direction of z-axis, it becomes negative) Contrarily, when the housing 1 is turned over with an angle of 180 degrees to make the second panel 11 upward and the first panel 11 downward, z-axis becomes downward as shown in FIG. 3B. At this time, gravity completely falls on z-axis, but a gravity of +g on z-axis will be detected because the direction of gravity is the same as z-axis. The controller 3 can judge that either the first panel 11 or the second panel 12 is upward according to the principle, and further control the relay 3 to make the upward keypad 111, 121 enable and the other one disable.

Figure 4:
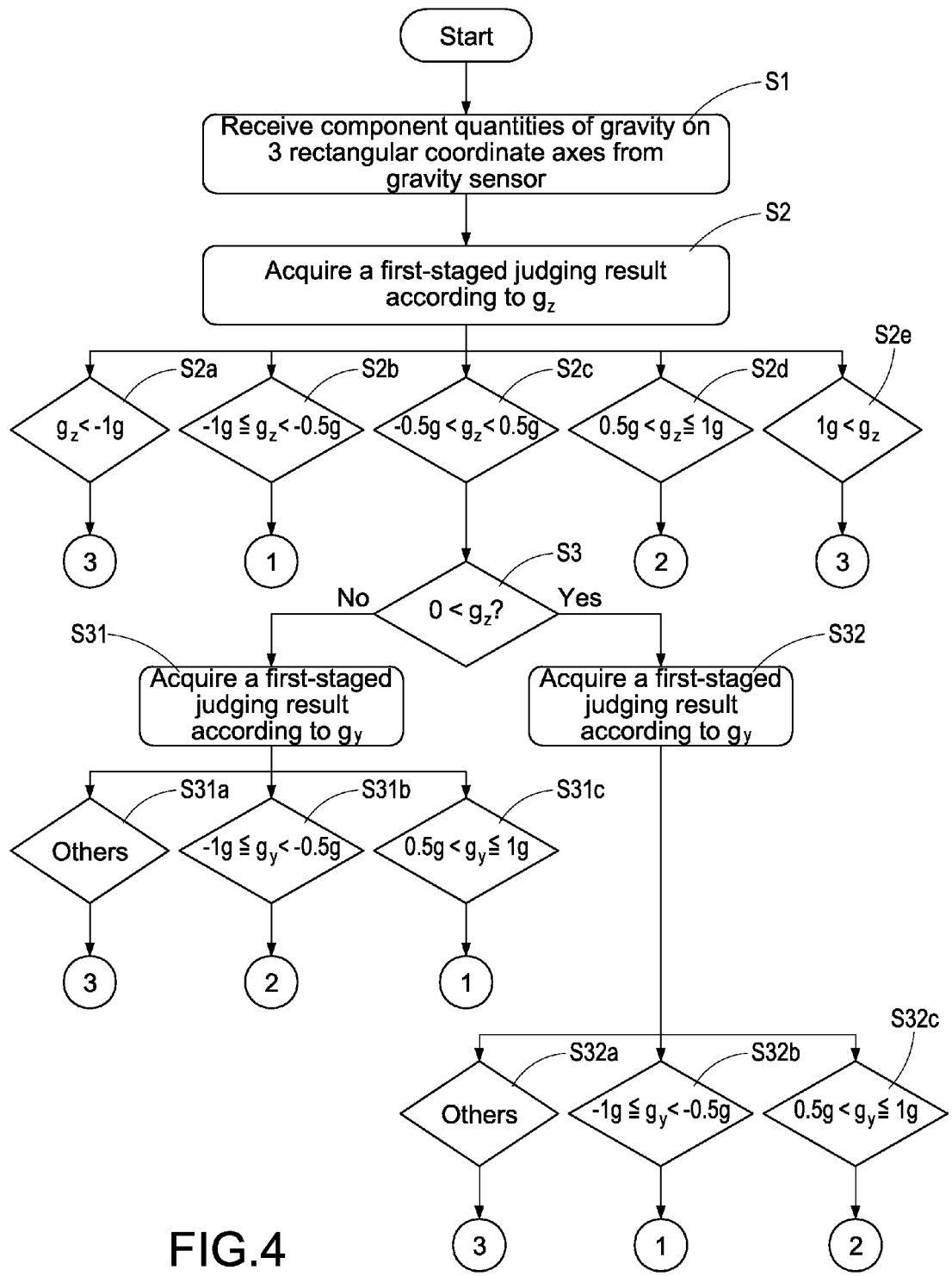
FIG. 4 illustrates a main portion of a flow diagram of the judging method according to the invention.
Figure 5:
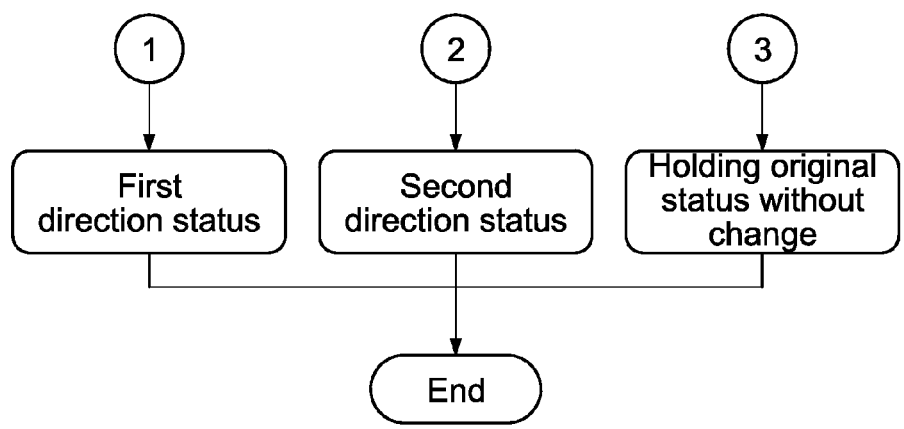
FIG. 5 illustrates another portion of the flow diagram according to the invention.

FIGS. 4 and 5 are the flow diagram of the judging method according to the invention. First, the method receives component quantities of gravity on three dimensional rectangular coordinate axes from the gravity sensor 2 in step S1, i.e. a component quantity on x-axis: $g_x$, a component quantity on y-axis: $g_y$, and a component quantity on z-axis: $g_z$. A first-staged judging result can be acquired by magnitude of the component quantity of gravity on z-axis ($g_z$) in step S2. In further detail, when $g_z$ is larger than 1 g or smaller than −1 g in steps S2a and S2e, i.e. an absolute value of $g_z$ is larger than 1 g, the method judges to be "don't care" in step S4c. The said term "don't care" means holding the original status without change. The value "1 g" is a first threshold because under a stationary condition any component quantity on one single axis should not be larger than 1 g or smaller than −1 g. Either of being larger than 1 g or being smaller than −1 g means the apparatus is in motion. At this time, the user should not be operating the apparatus, so no switching actions will occur. However, the value 1 g is just a typical one of the first threshold, which is not unchangeable. In reality, any value in the range between 1.2 g and 2 g can be selected as the first threshold. For example, 1.5 g can be another preferred value.

When $g_z$ is smaller than −0.5 g but not smaller than negative the first threshold (for example: −1 g) in step S2b, the method judges to be a first direction status in step S4a, i.e., either the first panel 11 or the second panel 12 is upward. FIG. 3 as an example, the first panel 11 is upward. When $g_z$ is larger than 0.5 g but not larger than positive the first threshold in step S2d, the method judges to be a second direction status in step S4b. The second direction status is contrary to the first direction status, which means the other one-sided panel is upward. FIG. 3 as an example, the second panel 12 is upward. When $g_z$ is not smaller than −0.5 g and not larger than 0.5 g in step S2c, the method further reposes on two parameters, which are the polarity (i.e. being positive or negative) of $g_z$ in step S3 and the magnitude of the component quantity on y-axis $g_y$ in steps S31 and S32, to judge. That is a second-staged judging result. When $g_z$ is negative in step S3N and $g_y$ is larger than 0.5 g but not larger than a second threshold in step S31c, the method judges to be the first direction status in step S4a. Similarly to the abovementioned first threshold, the second threshold may be equal to or larger than 1 g, and any value between 1.2 g and 2 g is available, particularly 1.5 g. When $g_z$ is negative in step S3N and $g_y$ is smaller than −0.5 g but not smaller than negative the second threshold in step S31b, the method judges to be the second direction status in step S4b. When $g_z$ is positive in step S3Y and $g_y$ is larger than 0.5 g but not larger than positive the second threshold in step S32c, the method judges to be the second direction status in step S4b. When $g_z$ is positive in step S3Y and $g_y$ is smaller than −0.5 g but not smaller than negative the second threshold in step S32b, the method judges to be the first direction status in step S4a. Additionally, when $g_y$ is out of the abovementioned range, in steps S31a and S32a, additionally including $g_z$ is zero, the method judges to be "don't care" uniformly.

The judging method abovementioned can simply use magnitude of component quantities of gravity on three axes to obtain a judging result without any calculation. Not only can the time required by the judging process be shortened, but also the required performance of the micrcoprocessors can be decreased.

An embodiment of the invention has been described. Nevertheless, it will be understood that various modifications may be made without departing from the spirit and scope of the invention. Accordingly, other embodiments are the scope of the following claims.

What is claimed is:

1. A method for judging directionality of a controlling device by utilizing a gravity sensor thereof, comprising the steps of:
    a) receiving, using a controller, component quantities of gravity on three rectangular coordinate axes ($g_x$, $g_y$, and $g_z$) from the gravity sensor;
    b) acquiring, using a controller, a first-staged judging result according to a magnitude of the component quantity on z-axis ($g_z$):
        b1) judging to be "holding original status without change" when an absolute value of the $g_z$ is larger than a first threshold being not smaller than 1 g;
        b2) judging to be a first direction status when the $g_z$ is smaller than −0.5 g but not smaller than negative the first threshold;
        b3) judging to be a second direction status when the $g_z$ is larger than 0.5 g but not larger than positive the first threshold;
        b4) temporarily acquiring no judging result when $g_z$ is not larger than 0.5 g and not smaller than −0.5 g; and
    c) acquiring, using a controller, a second-staged judging result after the step b4:
        c1) judging to be the first direction status when the $g_z$ is negative and the component quantity on y-axis ($g_y$) is larger than 0.5 g but not larger than a second threshold being not smaller than 1 g;
        c2) judging to be the second direction status when the $g_z$ is negative and the gy is smaller than −0.5 g but not smaller than negative the second threshold;
        c3) judging to be the second direction status when the $g_y$ is positive and the gy is larger than 0.5 g but not larger than positive the second threshold;
        c4) judging to be the first direction status when the $g_z$ is positive and $g_y$ is smaller than −0.5 g but not smaller than negative the second threshold; and
        c5) judging to be "holding original status without change" when the $g_y$ is out of a range defined in the steps c1-c4 or the $g_z$ is zero.

2. The method of claim 1, wherein the first threshold is between 1.2 g and 2 g.

3. The method of claim 2, wherein the first threshold is 1.5 g.

4. The method of claim 1, wherein the second threshold is between 1.2 g and 2 g.

5. The method of claim 4, wherein the second threshold is 1.5 g.

* * * * *